United States Patent [19]

Buma

[11] Patent Number: 4,671,323
[45] Date of Patent: Jun. 9, 1987

[54] CHECK VALVE FOR AIR SUSPENSION MECHANISM

[75] Inventor: Shuuichi Buma, Toyota, Japan

[73] Assignee: Toyota Jidosha Kabushiki Kaisha, Toyota, Japan

[21] Appl. No.: 837,072

[22] Filed: Mar. 6, 1986

Related U.S. Application Data

[63] Continuation-in-part of Ser. No. 699,123, Feb. 7, 1985, abandoned.

[30] Foreign Application Priority Data

Mar. 6, 1984 [JP] Japan .................. 59-31291

[51] Int. Cl.$^4$ ............................. F16K 15/14
[52] U.S. Cl. .................. 137/846; 267/64.21
[58] Field of Search ............ 137/846, 847; 251/82, 251/149.1, 149.4; 188/322.21; 267/64.19, 64.21, 64.23, 64.24, 64.27, 64.28

[56] References Cited

U.S. PATENT DOCUMENTS

| | | | |
|---|---|---|---|
| 238,232 | 3/1881 | Gruber | 251/149.4 |
| 2,328,382 | 8/1943 | Langdon | 137/846 |
| 2,373,555 | 4/1945 | Folke | 137/846 |
| 2,526,629 | 10/1950 | Bourke | 137/847 |
| 3,149,829 | 9/1964 | Baum | 267/64.21 |

Primary Examiner—Larry Jones
Assistant Examiner—Noah Kamen
Attorney, Agent, or Firm—Oblon, Fisher, Spivak, McClelland & Maier

[57] ABSTRACT

A check valve for an air chamber of an air suspension mechanism in which a shock absorber is surrounded by a housing and an elastic body to form the air chamber, includes an air supply tube, a connector welded airtightly to the housing and having on an outer peripheral surface a first thread and on an inner peripheral surface a second thread respectively, a valve body formed of a rubber to converge inward of the housing and having in an inner end a slit, a nut screwed onto the first thread of the connector to fix the valve body to the connector and a mounting nut screwed into the second thread of the connector to removably connect the air supply tube to the connector. The slit of the valve body is expanded by the air supply tube after a thread of the mounting nut is engaged with the second thread of the connector in one or a few screw threads.

5 Claims, 6 Drawing Figures

CHECK VALVE FOR AIR SUSPENSION MECHANISM

This application is a continuation-in-part application of Ser. No. 699,123, filed Feb. 7, 1985, now abandoned.

BACKGROUND OF THE INVENTION

1. Field of the Invention

This invention relates to a check valve for an air suspension mechanism, and more particularly to a check valve provided in an air spring of a MacPherson strut type air suspension mechanism for an automobile.

2. Description of the Prior Art

In a MacPherson strut type air suspension mechanism, a shock absorber is surrounded with a housing and an elastic body like a diaphragm to form an air chamber which is filled with compressed air to constitute an air spring.

Now, since in prior art suspensions a connection between the air chamber and a tube for supplying compressed air to the air chamber is not provided with a check valve for blocking flow of the compressed air from the air chamber to the tube, the compressed air in the air chamber leaks when the tube gets out of place, so that car height might be reduced and adversely effect controllability, riding comfort and may damage the diaphragm.

Also, conventionally, after the suspension is mounted on a car body, the air chamber is connected to an air supply source such as an air compressor through a tube mounted on the car body to supply compressed air to the air chamber. Thus, since the air chamber can not be filled with the compressed air until the suspension is mounted on the car body to enable the car to be run, air leaking from the air chamber could not be detected even when the shock absorber, the housing and the diaphragm are manufactured as an assembled unit. Further, since the air chamber could not be filled with dry air before the shock absorber is mounted on the automobile, a large capacity dryer is needed on the car body. Furthermore, when the suspension is installed in the car body in a production line, the car height is reduced to make it difficult to adjust the clearance and alignment of each part in the car body since the air chamber is not filled with compressed air.

SUMMARY OF THE INVENTION

Accordingly, an object of the present invention is to provide a check valve for an air suspension mechanism which prevents an air chamber from leaking air when a tube is disconnected.

A further object of the present invention is to provide a check valve for an air suspension mechanism which can maintain the air chamber filled with compressed air before a shock absorber is incorporated into a car body or the automobile is run.

The present invention provides a check valve for an air suspension mechanism in which a shock absorber is surrounded with a housing and an elastic body to form the air suspension mechanism. The check valve comprises an air supply tube, a connector having first and second ends thereof separated axially from each other and formed so as to enable said air supply tube to be inserted into and removed from said first end thereof, the connector being fixed airtightly to said housing with said second end thereof being disposed inside the housing and the connector comprising a threaded portion provided on an interior surface thereof and a mounting nut into which said air supply tube is fitted and having a threaded portion provided on an exterior surface thereof which is able to engage with said threaded portion of the connector. The check valve further comprises a valve body formed of an elastic material having a slit formed therein and fixed airtightly to said connector, wherein said slit of said valve body is expanded by said air supply tube after said threaded portion of the mounting nut is engaged with said threaded portion of the connector by one or more screw threads and said slit is closed before said threaded portion of the mounting nut is disengaged with the threaded portion of the connector.

According to the present invention, when the tube is misaligned the check valve serves to prevent the air chamber from leaking air, so that the car height is not reduced and so as to maintain controllability and riding comfort and to prevent the elastic body from being damaged.

Since the air chamber can be filled with compressed air, not through a tube provided originally in an automobile but through an additional tube, before or after the suspension mechanism is incorporated into the car body, the presence of air leakage from the air chamber can be inspected beforehand and clearance and alignment in a production line can be easily adjusted to reduce the required man-hours for such an operation.

Since the air chamber can be filled with dry air, the automobile does not need to be provided with a large capacity dryer for the suspension mechanism so that the weight and cost of the automobile can be reduced.

Since the valve body is opened and closed by the tube itself, the construction of the suspension mechanism is simple. Also, when the tube is removed from the connector, pressure in the air chamber acts on the valve body to press the slit. Consequently, the closing property of the slit itself is improved to increase the effect of preventing air leakage.

The slit of the valve body is formed so as to be expanded by said air supply tube after the threaded portion of the mounting nut is engaged with said threaded portion of the connector by one or more screw threads and to be closed before said threaded portion of the mounting nut is disengaged with the threaded portion of the connector. As a result, it is easy to connect the supply tube with the connector through the mounting nut and safety is ensured, because there is substantially no air escaping from the air chamber through the slit of the valve in connecting or disconnecting the supply tube.

BRIEF DESCRIPTION OF THE DRAWINGS

Other objects and features of the present invention will become apparent from the following description of a preferred embodiment of the invention with reference to the accompanying drawings, in which.

DESCRIPTION OF THE PREFERRED EMBODIMENT

Figure 1:
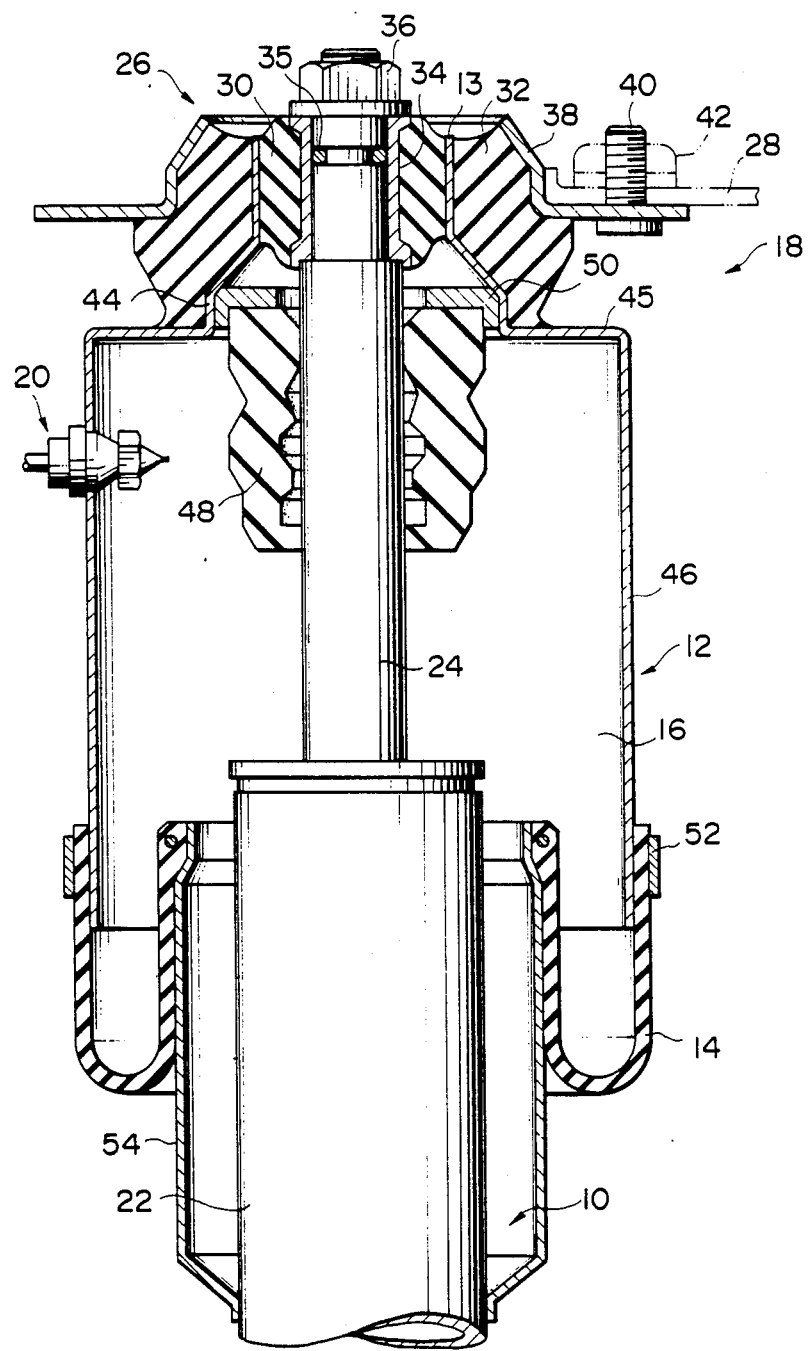
FIG. 1 is a sectional view showing an essential part of an air suspension mechanism provided with a check valve according to the present invention.

As shown in FIG. 1, this invention relates to a check valve 20 for an air suspension mechanism 18 in which a shock absorber 10 is surrounded by a housing 12 and an elastic body 14 to form an air chamber 16.

The shock absorber 10 comprises a cylinder 22 and a piston rod 24 connected to a piston slidably arranged in the cylinder 22 and projecting from the cylinder 22 to the outside. The piston is provided with a valve through which oil or other liquid received in the cylinder flows when the piston rod 24 is extended and contracted. Said construction is known per se and thus not shown in the drawing. Further, for the shock absorber 10 may be used a so-called monotube type one having only a single cylinder in addition to a so-called twin tube type one provided with the inside and outside cylinders.

The upper end of the piston rod 24 of the shock absorber 10 is connected to a car body 28 through a support member 26. The support member 26 shown in the drawing is provided with first and second bushings 30,32 respectively formed of rubber. A collar 34 and the upper cylindrical end 13 of the housing 12 are vulcanized and bonded respectively to the inside and outside of the first bushing 30. The upper end of the piston rod 24 on which a sealing O-ring 35 is mounted extends through the collar 34, and a nut 36 is screwed onto said end and tightened. Thus, the piston rod 24 is connected to the first bushing 30. On the other hand, the end 13 of the housing 12 and a fixed plate 38 are vulcanized and bonded respectively to the inside and outside of the second bushing 32. The fixed plate 38 is abutted to the car body 28, and a nut 42 is screwed onto a bolt 40 extending through the fixed plate 38 and the car body 28 and tightened to connect the fixed plate 38 to the car body 28.

In the embodiment shown in the drawing, since vibration transmitted from the shock absorber 10 to the car body 28 can be received by the first bushing 30 and vibration transmitted from an air spring to the car body 28 by the second bushing 32, the spring constant of the first bushing 30 can be set so as to be relatively small and that of the second bushing 32 can be set so as to be relatively large. Thus, riding comfort can be improved. However, the housing 12 may be fixed directly to the piston rod 24.

The housing 12 comprises the upper cylindrical end 13, a slant portion 44 diverging from the end 13, a ceiling portion 45 extending from the slant portion 44 radially outward and an enlarged cylindrical portion 46 extending downward from the ceiling portion 45. Into the slant portion 44 is fitted a retainer 50 of a bound stopper 48.

The elastic body 14 in the embodiment shown in the drawing is a diaphragm formed cylindrically of rubber. This elastic body 14 is folded back substantially at the central portion, the outside end being sandwiched between the enlarged end 46 of the housing 12 and a ring 52 and fixed to the housing 12 by caulking the ring 52. The inside end of the elastic body 14 is fitted onto an air piston 54 welded to the cylinder 22. Thus, the air chamber 16 is formed in cooperation with the housing 12 and the elastic body 14.

By providing the air piston 54, the capacity of the air chamber 16 can be enlarged, and the elastic body 14 can be prevented from direct contact with the outer peripheral surface of the cylinder 22 to reduce degradation of the elastic body 14 due to heat. However, this air piston 54 may be omitted. In such a case, the inside end of the elastic body 14 is fixed directly to the cylinder 22. The elastic body 14 may be a bellows.

Figure 2:
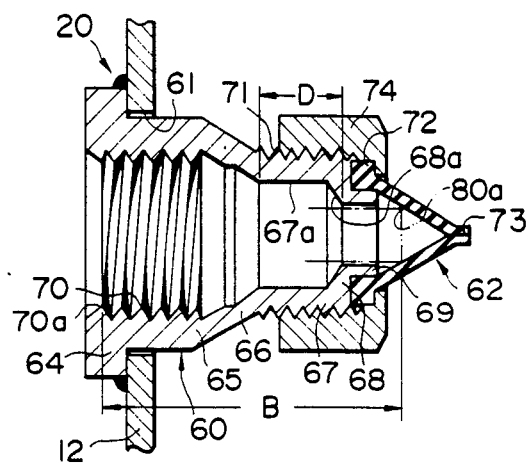
FIG. 2 is a sectional view of the check valve.
Figure 3:
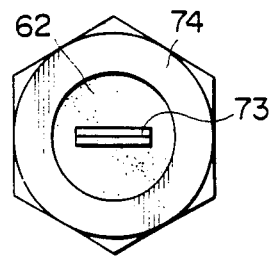
FIG. 3 is a right side view of the check valve.

The check valve 20 is provided with a connector 60 and a valve body 62 as shown in detail in FIGS. 2 and 3.

The connector 60 is formed to removably attach a tube for supplying air and is fixed airtightly to the housing 12. In the embodiment shown in the drawing, the connector 60 comprises a flange 64, a cylindrical portion 65 extending horizontally from the flange 64, a slant portion 66 converging from the cylindrical portion 65, a cylindrical portion 67 extending horizontally from the slant portion 66, and abutting portion 68 extending radially inward from the cylindrical portion 67 and a cylindrical portion 69 extending horizontally from the abutting portion 68. The connector 60 is inserted through a hole 61 in the housing 12 and the flange 64 is welded to the housing 12 over the whole periphery thereof. The cylindrical portion 65 is provided on an interior surface with a screw threaded portion 70 and the cylindrical portion 67 is provided on an exterior surface with a screw threaded portion 71.

The valve body 62 is formed by an elastic material such as rubber and plastic to converge axially of the connector 60 and is provided on an end portion thereof with a slit 73. In the embodiment shown in the drawing, the valve body 62 as a whole is shaped like a duck bill extending from a base 72 having a circular thick portion toward the end which has the slit 73. The slit 73 is expanded by the tube when the tube is connected to the connector as will be later described, and the air chamber 16 communicates to the outside through the slit 73. When the tube is disconnected from the connector, the slit 73 is closed to shut off communication between the air chamber 16 and the outside.

The base 72 of the valve body 62 is fitted onto the cylindrical portion 69 of the connector 60 and a nut 74 is screwed onto the screw thread 71 on the exterior surface of the cylindrical portion 67 of the connector 60 to urge the base 72 against the abutting portion 68 and to fix the valve body 62 to the connector 60. Under such a condition the air chamber 16 is shut off from the outside.

Figure 4:
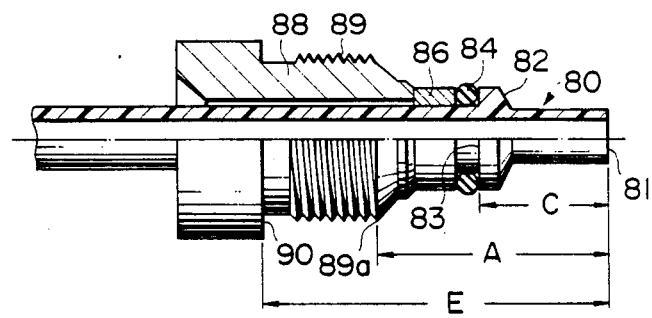
FIG. 4 is a front view of a tube with the upper half being sectioned.

In the embodiment shown in the drawing, a tube 80 for supplying compressed air is formed of nylon and provided on an end portion with a flange 82 integrally as shown in FIG. 4. Onto the tube 80 are fitted a sealing O-ring 84, a spacer 86 and a mounting nut 88 in the mentioned order. The mounting nut 88 is provided on an exterior surface with a thread 89 capable of being screwed onto the thread 70 on the cylindrical portion 65 of the connector 60.

The distance A between an end 81 of the tube 80 and the beginning turn 89a of the thread 89 is smaller than the distance B between an abutting point 80a of the tube 80 against the valve body 62 and the beginning turn 70a of the thread 70. The difference of the distances is determined such that the slit 73 of the valve body 62 is expanded by said air supply tube 80 after the thread 89 of the mounting nut 88 is engaged with said thread 70 of the connector 60 in one or a few screw threads and the slit 73 is closed before said thread 89 of the mounting nut 88 is disengaged with thread 70 of the connector 60. According to the aforementioned constitution, there is substantially no air escaping from the air chamber 16 through the slit 73 in connecting and disconnecting the tube 80.

The distance C between the end 81 of the tube 80 and an end 83 of the flange 82 is larger than the distance D which corresponds to an axial length of the cylindrical portion 67 and an axial length of a slant surface 68a provided in an inner periphery of the abutting portion 68. The difference of the distances is determined such that the O-ring 84 contacts an interior surface 67a of the cylindrical portion 67 after the end 81 of the tube 80 is inserted by one or a few milimeters into a bore of the cylindrical portion 69. As a result, O-ring 84 is directed precisely to a bore of the cylindrical portion 67 without causing any damage because the O-ring 84 is centered by both threads 70,89 on one hand and by guiding function of the bore of the cylindrical portion 69 on the other hand.

The distance E between a shoulder 90 of the mounting nut 88 and the end 81 of the tube 80 is determined such that when the mounting nut 88 is fastened to contact closely to the connector 60, the tube 80 abuts against the valve body 62 to expand sufficiently the slit 73 in the valve body 62.

Operation of the embodiment

Figure 5:
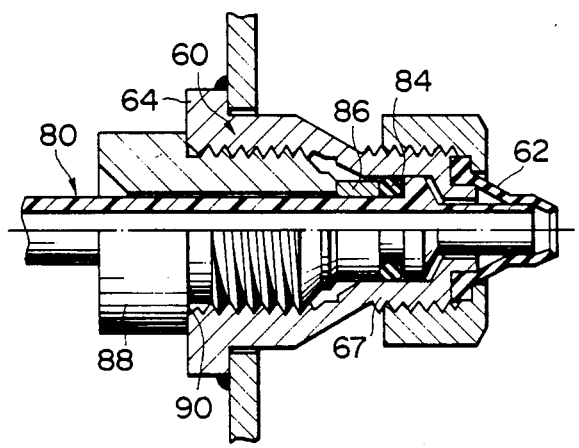
FIG. 5 is a sectional view showing the check valve incorporative the tube.
Figure 6:
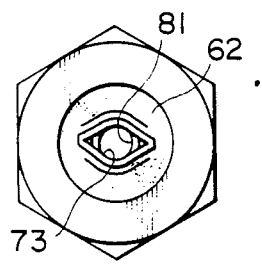
FIG. 6 is a right side view of the check valve shown in FIG. 5.

The tube 80 onto which the mounting nut 88 is fitted rotatably is inserted in the connector 60, and the nut 88 is screwed onto the thread 70 of the cylindrical portion 65 of the connector. When the mounting nut 88 is so screwed in and the shoulder 90 closely contacts the flange 64 of the connector 60 as shown in FIG. 5, it is assured that the mounting nut 88 is sufficiently screwed into said portion 65. Then, the end of the tube 80 abuts against the valve body 62 to expand the slit 73 of the valve body 62 as shown in FIGS. 5 and 6 and the O-ring 84 closely contacts the inner peripheral surface of the second cylindrical portion 67 of the connector 60. Under such a condition, compressed air can be supplied to the air chamber 16 through the tube 80.

When the mounting nut 88 is disconnected from the connector 60 after a predetermined amount of compressed air is supplied to the air chamber 16, or when the mounting nut 88 is loosened and the end of the tube 80 is separated from the valve body 62, the slit 73 of the valve body 62 is closed by the elasticity of valve body 62. Under such condition, pressure in the air chamber 16 acts on the valve body 62 to further close the slit 73, so that the airtightness characteristic of the slit 73 is sufficiently improved.

Before the suspension mechanism 18 is incorporated in the car body or when alignment is adjusted after said suspension mechanism 18 is incorporated and when automobiles are still on the production line, a tube other than one to be originally provided on the car body is used for the tube 80.

Obviously, numerous modifications and variations of the present invention are possible in light of the above teachings. It is therefore to be understood that within the scope of the appended claims, the invention may be practiced otherwise than as specifically described herein.

What is claimed is:

1. A check valve in an air chamber of an air suspension mechanism in which a shock absorber is surrounded with a housing and an elastic body to form said air chamber and a tube is provided for supplying air to the air chamber, said check valve comprising:
    a connector having first and second ends thereof separated axially from each other and formed so as to enable said air supply tube to be inserted into and removed from said first end thereof, the connector including a threaded portion provided on an interior surface thereof wherein the housing to which said connector is fixed airtightly with said second end thereof is disposed inside the housing;
    a mounting nut into which said air supply tube is fitted and having a threaded portion provided on an exterior surface thereof which is capable of engaging with said threaded portion of the connector; and
    a valve body formed of an elastic material having a slit formed therein and fixed airtightly to said connector,
    wherein a distance between an end surface of the tube and a beginning turn of said threaded portion of the mounting nut is smaller than a distance between an abutting point of the tube against the valve body and a beginning turn of said threaded portion of the connector such that during removal of said mounting nut from said connector said slit is closed before said threaded portion of said mounting nut is disengaged from said threaded portion of said connector.

2. A check valve for an air chamber of an air suspension mechanism as claimed in claim 1, wherein said valve body converges inward of said housing and said slit is provided in an inner end of said valve body.

3. A check valve for an air chamber of an air suspension mechanism as claimed in claim 1, wherein said mounting nut includes a shoulder and a distance between said shoulder and the end surface of the air supply tube is of such a length that said slit of the valve body is expanded by said tube when said shoulder abuts against the connector.

4. A check valve in an air chamber of an air suspension mechanism in which a shock absorber is surrounded with a housing and an elastic body to form said air chamber and a tube is provided for supplying air to the air chamber, said check valve comprising:
    a connector having first and second ends thereof separated axially from each other and form so as to enable said air supply tube to be inserted into and removed from said first end thereof, the connector including a cylindrical portion extending from an end surface of said second end, an abutting portion extending radially outward from said cylindrical portion and a first and a second threaded portions respectively provided on an exterior and an interior surfaces of the connector;
    the housing to which said connector is fixed airtightly with said second end thereof being disposed inside the housing;
    a mounting nut into which said air supply tube is fitted and having a third threaded portion provided on an exterior surface thereof which is capable of engaging with said second threaded portion of the connector;
    a valve body formed of an elastic material having a slit formed therein and which is fitted onto an exterior of said cylindrical portion of the connector; and
    a nut screwed into said first threaded portion of said connector for airtightly fitting said valve body onto said exterior of said cylindrical portion and wherein an end surface of said valve body abuts against said abutting portion, wherein a distance between an end surface of the tube and a beginning turn of said third thread of the mounting nut is smaller than that between an abutting point of the tube against the valve body and a beginning turn of said second thread of the connector such that during removal of said mounting nut from said connector said slit is closed before said threaded portion of said mounting nut is disengaged from said threaded portion of said connector.

5. A check valve in an air chamber of an air suspension mechanism in which a shock absorber is surrounded with a housing and an elastic body to form said air chamber and a tube having a flange disposed axially from an end surface thereof is provided for supplying air to the air chamber, said check valve comprising:

a connector having first and second ends thereof separated axially from each other and formed so as to enable said air supply tube to be inserted into and removed from said first end thereof, the connector including a first cylindrical portion extending from an end surface of said second end, an abutting portion extending radially outward from said cylindrical portion, a second cylindrical portion extending from said abutting portion and having larger diameter than that of the first cylindrical portion and a first and a second threaded portions respectively provided on an exterior and an interior surfaces of the connector wherein the housing to which said connector is fixed airtightly with said second end thereof is disposed inside the housing;

a mounting nut into which said air supply tube is fitted and having a third threaded portion provided on an exterior surface thereof which is capable of engaging with said second threaded portion of the connector;

a sealing O-ring fitted onto said air supply tube and disposed between said flange of the tube and said mounting nut;

a valve body formed of an elastic material having a slit formed therein and which is fitted onto an exterior of said first cylindrical portion of the connector; and a nut screwed into said first threaded portion of said connector for airtightly fitting said valve body onto said exterior of said first cylindrical portion and wherein an end surface of said valve body abuts against said abutting portion, wherein a distance which is substantially the length of the second cylindrical portion of the connector is smaller than that between an end surface of the tube and a surface of the flange, and wherein a distance between an end surface of the tube and a beginning turn of said third thread of the mounting nut is smaller than that between an abutting point of the tube against the valve body and a beginning turn of said second thread of the connector such that during removal of said mounting nut from said connector said slit is closed before said threaded portion of said mounting nut is disengaged from said threaded portion of said connector.

* * * * *